(12) United States Patent
George et al.

(10) Patent No.: US 11,598,189 B2
(45) Date of Patent: Mar. 7, 2023

(54) CONTROL, INTEGRATION, AND MODULATION SYSTEMS AND METHODS FOR REGULATING HYDRAULIC FRACTURING SYSTEMS WHEN COMBINED WITH A PRESSURE EXCHANGE SYSTEM

(71) Applicant: NexTier Completion Solutions Inc., Houston, TX (US)

(72) Inventors: Paul George, Denver, CO (US); James Montemayor, Houston, TX (US); Brian Parr, Houston, TX (US); Andy Cox, Houston, TX (US)

(73) Assignee: NEXTIER COMPLETION SOLUTIONS INC., Houston, TX (US)

( * ) Notice: Subject to any disclaimer, the term of this patent is extended or adjusted under 35 U.S.C. 154(b) by 311 days.

(21) Appl. No.: 16/898,280

(22) Filed: Jun. 10, 2020

(65) Prior Publication Data
US 2020/0392827 A1 Dec. 17, 2020

Related U.S. Application Data

(60) Provisional application No. 62/860,013, filed on Jun. 11, 2019.

(51) Int. Cl.
*F04F 13/00* (2009.01)
*E21B 43/26* (2006.01)
(Continued)

(52) U.S. Cl.
CPC .......... *E21B 43/2607* (2020.05); *F04B 15/02* (2013.01); *F04B 49/22* (2013.01);
(Continued)

(58) Field of Classification Search
CPC .... E21B 43/2607; F04B 15/02; F04B 49/065; F04F 13/00; G01F 22/00; G01N 11/00; G05D 7/0635
See application file for complete search history.

(56) References Cited

U.S. PATENT DOCUMENTS 8,789,596 B2   7/2014   Curtis et al.
9,284,830 B2   3/2016   Frisk et al.
(Continued)

FOREIGN PATENT DOCUMENTS

CN   105112040 A   8/2015

OTHER PUBLICATIONS

Gusek et al., Innovative New Frac Manifold Trailer Offers Step Change in Slickwater Pumping, Sep. 28-30, 2015, SPE Annual Technical Conference and Exhibition, Houston, Texas, 11 pp. (Year: 2015).*

*Primary Examiner* — Toan M Le
(74) *Attorney, Agent, or Firm* — Avek IP, LLC

(57) ABSTRACT

A method for optimizing pressure exchange includes providing a first pressure exchange system comprising an energy recovery device (ERD). A second system supplies high-pressure fluid, energized by a positive displacement pump, to the ERD. A third system supplies low-pressure fluid to the ERD. The first system energizes the low-pressure fluid with the high-pressure fluid to form a high-pressure fracking fluid, which is delivered from the first system to a well-head. A rate of required flow is input into a control system, which determines a rate of flow of the high-pressure fluid, a rate of flow of the low-pressure fluid, and an actual rate of flow of the fracking fluid at the well-head. The control system then adjusts to equilibrium: the rate of flow of the high-pressure fluid based on the actual rate of flow; and the rate of flow of the low-pressure fluid based on the actual rate of flow.

19 Claims, 3 Drawing Sheets

(51) Int. Cl.
*F04B 15/02* (2006.01)
*F04B 49/22* (2006.01)
*G05D 7/06* (2006.01)
*G01N 9/36* (2006.01)
*G01F 22/00* (2006.01)
*G01N 11/00* (2006.01)

(52) U.S. Cl.
CPC ............... *G01F 22/00* (2013.01); *G01N 9/36* (2013.01); *G01N 11/00* (2013.01); *G05D 7/0635* (2013.01)

(56) References Cited

U.S. PATENT DOCUMENTS

| | | |
|---|---|---|
| 9,759,054 B2 | 9/2017 | Gay et al. |
| 2014/0048470 A1 | 2/2014 | Lalli |
| 2015/0096739 A1 | 4/2015 | Ghasripoor et al. |
| 2017/0292358 A1 | 10/2017 | Elish et al. |
| 2017/0306987 A1 | 10/2017 | Theodossiou |

* cited by examiner

CONTROL, INTEGRATION, AND MODULATION SYSTEMS AND METHODS FOR REGULATING HYDRAULIC FRACTURING SYSTEMS WHEN COMBINED WITH A PRESSURE EXCHANGE SYSTEM

CROSS-REFERENCE TO RELATED APPLICATIONS

This application claims the benefit of priority of U.S. Provisional Patent Application No. 62/860,013, filed Jun. 11, 2019, the disclosure of which is incorporated by reference herein in its entirety.

FIELD OF THE INVENTION

The invention relates generally to regulating, control, timing, and modulation of positive displacement pumps (PD Pumps) when used in conjunction with a pressure exchange system.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to one embodiment, a method for optimizing pressure exchange in a pressure exchange system includes first providing an assembly comprising a first system, a second, system, and a third system, wherein: the first system is a pressure exchange system comprising an energy recovery device; the second system supplies high-pressure fluid to the first system for the energy recovery device, wherein the high-pressure fluid of the second system is energized by at least one positive displacement pump; and the third system supplies low-pressure fluid to the first system for the energy recovery device. The first system energizes the low-pressure fluid from the third system with the high-pressure fluid from the second system to form a high-pressure fracking fluid; and the second system delivers the high-pressure fracking fluid from the first system to a well-head receiving system.

The method further includes providing a control system; inputting a rate of required flow into the control system; determining, via the control system, a rate of flow of the high-pressure fluid from the second system; determining, via the control system, a rate of flow of the low-pressure fluid from the third system; determining, via the control system, an actual rate of flow of the high-pressure fracking fluid at the well-head receiving system; and adjusting to equilibrium, via the control system, the rate of flow of the high-pressure fluid from the second system based on the actual rate of flow and the rate of flow of the low-pressure fluid from the third system based on the actual rate of flow.

According to another embodiment, a method for optimizing pressure exchange in a pressure exchange system includes first providing an assembly comprising a first system, a second, system, and a third system, wherein: the first system is a pressure exchange system comprising an energy recovery device; the second system supplies high-pressure fluid to the first system for the energy recovery device, wherein the high-pressure fluid of the second system is energized by at least one positive displacement pump; and the third system supplies low-pressure fluid to the first system for the energy recovery device. The first system energizes the low-pressure fluid from the third system with the high-pressure fluid from the second system to form a high-pressure fracking fluid; and the second system delivers the high-pressure fracking fluid from the first system to a well-head receiving system.

The method further includes providing a control system; inputting a rate of required flow into the control system; determining, via the control system, a rate of flow of the high-pressure fluid from the second system; determining, via the control system, a rate of flow of the low-pressure fluid from the third system; determining, via the control system, an actual rate of flow of the high-pressure fracking fluid at the well-head receiving system; and adjusting, via the control system, the rate of flow of the high-pressure fluid from the second system to the required rate of flow; and adjusting, via the control system, the rate of flow of the low-pressure fluid from the third system such that the rate of flow of the low-pressure fluid from the third system is greater than the required rate of flow.

WRITTEN DESCRIPTION

Figure 1:
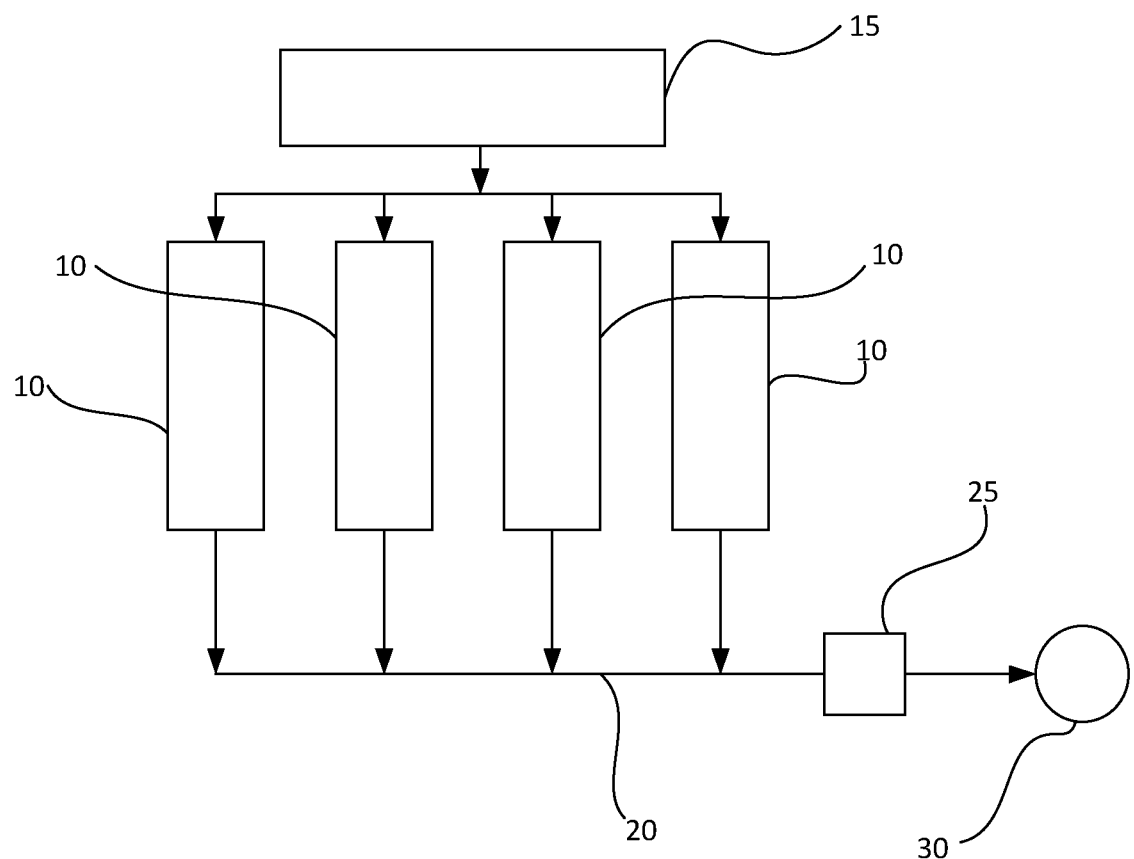
FIG. 1 is a block diagram of a traditional prior art pressure exchange system.

Various pressure exchange systems are used in the water desalination industry. These systems have generally been designed to exchange energy between clean and dirty fluids at relatively low pressures. They reciprocate clean and dirty fluid systems within conduits where the high-pressure fluid transfers energy to the low-pressure fluid and subsequently energizes the dirty fluid to a high-pressure state.

Fluid pressure exchanges occur using a continuously reciprocating fluid motion within multiple conduits, alternating and working together. The system depends on being supplied with a continuous input source of energized clean fluid and a continuous input source of low-pressure dirty fluid, and results in a continuous output flow of energized dirty fluid. The system operates at very high efficiencies, with the resulting energized dirty energized fluid being nearly equal in output from the perspective of rate and pressure to the clean high-pressure fluids used as input.

Traditional pressure exchange systems, as used for example in desalination systems, operate at pressure ranges in the order of 1,000 PSI. In a traditional pressure exchange system where the input fluids are controlled, regulated, and modulated by a functioning valve or valves, these valves by design must move and sequence through the positions of fully open, fully closed, or some degree of open or closed as they regulate the pressurized fluid flow in the pressure exchange vessels themselves. This means that there are instantaneous pressure transients present during each cycle of opening and closing.

Additionally, the rate of the reciprocating fill and empty cycles are a function of input pressures, output pressures, and the resistance of the receiving system. Current systems generally operate with stable pressures, and the receiving systems have a constant resistance, meaning they are easier to regulate and control. In other words, the regulation of the input pumps, and timing of the opening and closing of the valves as it relates to optimal operation is stable, and does not require constant adjustment.

Often, in existing low-pressure exchange systems, the fluid types that are being energized in the pressure exchange process have very consistent characteristics that do not change during operation. Generally, the fluid densities are consistent, the chemical compositions are consistent, and the concentration of particulate matter is generally absent. This means that the regulation of the input pumps, and timing of the opening and closing of the valves as it relates to optimal operation is stable, and does not require constant adjustment.

Still another characteristic of traditional pressure exchange systems is that the input supplies for both clean and dirty fluid is provided by a mechanical pump system which is not adversely affected by transients in pressure or flow rate caused by the opening and closing of the valves regulating flow, or changes in resistance from the receiving system. Typically, centrifugal pumps are used for this purpose, which to a significant degree can deal with these effects. A centrifugal pump, by design, allows for the bypass of fluids should its output line be choked, opened, closed, or restricted. This is due to the various fluid laws and principles acting in conjunction with the rotating members used to energize the fluids in the centrifugal pump, and as would be known by anyone familiar with these arts.

In addition to using centrifugal pumps, accumulators are used to compensate for the pressure and flow transients associated with the opening and closing of the valves supplying the input fluids to the pressure exchange system and changes in resistance from the receiving system. The accumulators dampen the effects of the valves opening and closing, resistance changes, the subsequent fluid pressure waves that are created, and the resulting vibrations, pulsations, and other effects.

In low-pressure systems (for example, as is found in desalination systems), the principles and approaches associated with centrifugal pumps and accumulators work adequately, and are such that the effect of transient pressure and rate due to the opening and closing of the valves can be adequately compensated.

In general, a pressure exchange assembly for low-pressure operations includes several conjoined systems operating together. A first system of the pressure exchange assembly is a pressure exchange system which regulates the opening and closing of valves to allow high-pressure clean fluid into a cylinder whereby it may "exchange energy" with a secondary dirty fluid.

The second system of the pressure exchange assembly is responsible for supplying the high-pressure clean fluid into the pressure exchange system. After the pressure exchange takes place in the first system, the second system receives and delivers low-pressure clean fluids back for re-pressurization. The second system is the source of energy to be used in the pressure exchange conduits, and is generally operated at a stable rate of supply—the second system supply is always positively charged at a stable pressure with respect to the supply from the third system (described below). The second system is capable of providing fluid such that when the first system opens a valve, the second system supplies a high-pressure volume of clean fluid to a first conduit for pressure exchange to occur, while receiving low-pressure clean fluids exhausted from a second conduit, and delivering this back to the system for disposal and/or reuse. The second system provides a stable supply, is generally required to provide adequate positive supply, and it can compensate for the many transients caused by the opening and closing of the valves in the first system.

The third system is responsible for supplying the low-pressure dirty fluid into the pressure exchange system, and after pressure exchange takes place in the first system, receiving and delivering high-pressure dirty fluids for use in separate independent receiving systems. The third system provides the source of the low-pressure fluid supply to be used in the pressure exchange conduits, and the supply is always charged at a stable positive pressure that is less than the second system, but of adequate charge pressure that it can displace de-energized clean fluid from a second conduit in a timely manner. The third system provides low-pressure fluid such that when the first system opens a valve, a volume of low-pressure fluid is supplied to a second conduit in preparation for energy exchange to occur, and at the same time (or substantially the same time) collects and directs the newly energized high-pressure dirty fluid being exhausted from a first conduit for delivery to the appropriate receiving system. This third system is stable in terms of supply—it is generally required to provide adequate positive supply, and it can compensate for the many transients caused by the opening and closing of the control valves in the first system.

In operation, typically a "charge" pressure and flow is initiated in the second system and the third system to establish adequate supply to meet the demand of the first system where pressure exchange occurs. Typically, the fluid input from the second system into the first system operates at a higher pressure than the fluid input from the third system, which historically would be in the order of hundreds of PSI of pressure and relatively stable. The rate of supply from the second and third systems at any point in time must always be balanced. Once adequate supply and pressure is present in the second and third systems, then the opening and closing of the valves in the first system is adjusted to optimize the pressure exchange process. The components, assemblies, valves, sensors and processors in the first system generally control and regulate flow through the pressure exchange by adjusting the timing of the valves. The first, second, and third supply systems may be adjusted to some degree, but in general are maintained in a stable state and not highly regulated, variable, or controlled once operations are established.

Traditionally, when the first system opens, closes, slows, speeds up, stops, or starts, the responses of the second and third systems are buffered, or compensated enough such that no significant pressure build-ups or transients occur. As described above, the supply of clean and dirty fluid from the second and third systems, respectively, is traditionally sourced and maintained by centrifugal pumps, which, by design, allow for fluid shear and fluid bypass. Any instantaneous variations in volumes and pressures can easily be compensated with accumulator systems, and the tolerance for regulation of pressures and rates in the second and third systems is generally high. Near instantaneous and continuous adjustment of pump supply pressures and/or supply rate in the second and third systems is not required. Moreover, near instantaneous control and response times for system regulation of the second and third systems is not required.

New very high-pressure fluid exchange systems (up to and exceeding 10,000 PSI) are being designed for integration into high-pressure fracturing systems. These new systems are being designed and operated at significantly higher pressures and rates than traditional systems used in other domains or applications. Engineering designs and control systems for such new high-pressure exchange systems must be changed in order to address the very high forces that are present, and new operating practices must be developed.

More specifically, the controls and designs associated with low-pressure systems are inadequate to cope with the high-pressures, rates, and variability present in high-pressure systems, such as those used in the hydraulic fracturing process when using pressure exchange principles. The high-pressure systems must be capable of working in an environment where pressures and rates are in the order of 10,000 PSI and 0-100 barrels per minute or more, which significantly changes the sensitivity of the system to any variation in supply or demand, and required margins of safety. In many high-pressure systems, the fluid rate, fluid pressure, fluid density, and fluid chemical composition is varied in real time via a program provided by the engineers who designed the frack. The fluid being pumped using the pressure exchange cannot deviate in makeup, constituents, concentrations, etc., and must be pumped per the frack program design, and deviations from the design can be catastrophic to the outcome of the frack—namely, a significant reduction in long term well production. This means that system parameters that control the pressure and rate of fluids supplying the pressure exchange system must be constantly changed to maintain accurate regulation without loss of control of these characteristics.

The control of the system parameters is based on real time information from the well. The wellbore system which is receiving the high-pressure fluids is dynamic and has a variable resistance; at any time during the hydraulic fracturing process, the well bore and formation resistance can instantaneously, and significantly, increase or decrease. When the resistance in the well bore changes, the pressures and rates in the first, second, and third systems will be affected. Any change in resistance in the wellbore system means that control and timing of the first, second, and third systems will have to be highly and actively regulated through a new control system, described in greater detail below, such that the rate of supply output provided by the pumps in the third system matches the rate of supply input provided by the second system, and they are both matched to the demand requirements, timing, and control of the first (pressure exchange) system.

Moreover, the differential pressures between the high-pressure clean fluids and the low-pressure dirty fluids may vary significantly. The differential pressures will be different when, for example: the fracking program is first started; stage rates are being ramped up and the frack is being initiated; various intermediate processes are carried out during a fracking stage; and when a fracking stage is being finalized. The differential pressure can range from several hundred PSI, to an order of thousands of PSI. Accordingly control and timing of the first, second, and third systems will have to be highly and actively regulated through a new control system such that the supply output provided by the pumps in the third system matches supply input provided by the second system, and they are both matched to the demand requirements, timing, and control of the first system, or pressure exchange system, which is based on the real-time characteristics of the well.

FIG. 1 illustrates a prior art configuration of prior art pump control system in a pressure exchange system. Here, multiple pumps 10 are regulated by a single control system 15. Output lines from the pumps 10 are collected into one or more high pressure flow line 20 that is sent to the wellhead 30. One or more pressure relief valves 25 are present in the flow line 20 to vent to atmosphere any overpressure and to prevent equipment damage should plugging occur. The wellbore and the formation act as the accumulator at high rates and pressures, and the structures ultimately provide system elasticity. Accordingly, it is the wellbore (and the formation) that regulates the pressure and rate, barring wellbore plugging or equipment failure.

Figure 2:
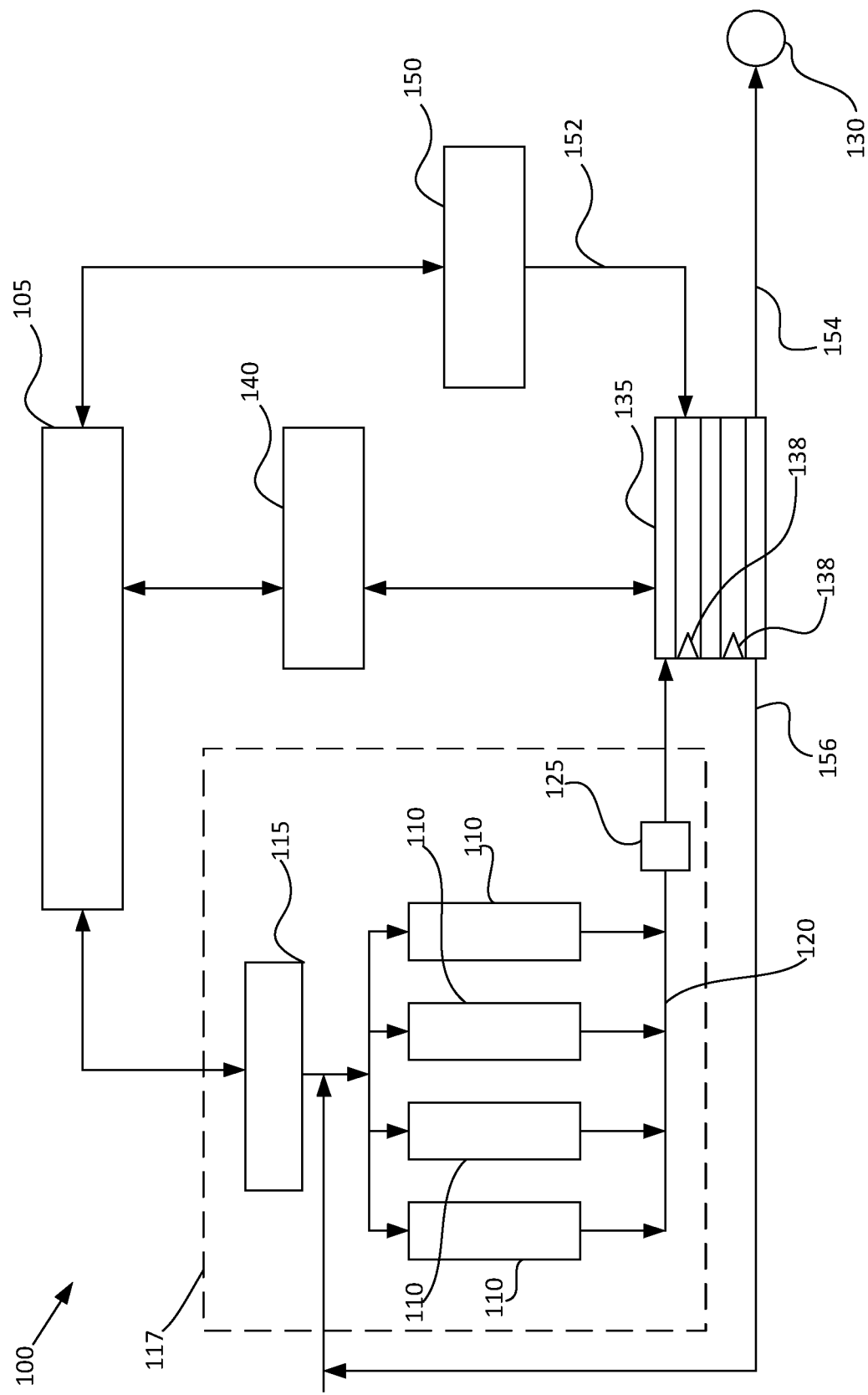
FIG. 2 is a block diagram of a pressure exchange system according to an embodiment of the claimed invention.

FIG. 2 is a block diagram of a system 100 according to embodiments of the invention. The system 100 includes an integrated control system 105 that is configured to control operation of the system 100 as a function of pump rates, pressure exchange rate, dirty fluid supply, general flow, and other system conditions. The control system 105 is in operable communication with one or more pump controllers 115 that regulates one or more pumps 110. The high-pressure clean-fluid output from the pumps 110 is joined in a high-pressure flow line 120 for delivery to the pressure exchange system 135. The high-pressure flow line 120 may include a pressure relief system 125 to vent to atmosphere any overpressure and to prevent equipment damage should plugging occur. The pressure exchange system 135 includes pressure exchange valves 138 that are opened and closed to complete the pressure exchange within the system 135. The pressure exchange valves 138 are controlled via a pressure exchange control system 140 that is in operable communication with the integrated control system 105. A dirty fluid supply 150, also in operable communication with the integrated control system 105, supplies low-pressure dirty fluid 152 for pressurization in the pressure exchange system 135. Once the pressure exchange occurs, high-pressure dirty fluid 154 is delivered to the wellhead 130, while low-pressure clean fluid 156 may be returned to the pumps 110 for re-pressurization.

According to embodiments of the invention, in order to meet the demands of the high-pressure systems in fracking environments, energized clean fluid supply from the second system (i.e., the pumps 110 and the pump controller(s) 115) is provided by multiple high-pressure positive displacement (PD) pumps rather than centrifugal pumps. PD pumps behave entirely differently than centrifugal pumps with respect to mechanical design, principles of operations and characteristics for coping with any changes, or transients occurring in the pressure, rate, and fluid composition. A PD pump is incapable of allowing fluid to bypass—it is a sealed system in which the forces provided by the power source, such as an engine, are directly transferred to the fluids contained within the PD pump. The engine, transmission, gearboxes, and associated connections to the PD pump are generally mechanical in nature, and have no method of dissipating, relieving, and or absorbing instantaneous energy transitions.

The integrated control system 105 maintains alignment between the pumps 110 and the pressure exchange system 135. More specifically, there is little, if any, elasticity in the high-pressure system between the pumps 110 and the pressure exchange valves 138. If the valves 138 in the pressure exchange system 135 are opened, closed, slowed, to stopped, the pumps 110 must accordingly react. The control system 105 ensures that the pumps 110 react in accordance with the pressure exchange system 135.

In operation, the high-pressure PD pumps 110 are coordinated with the pressure exchange 135, and are actively regulated through the control system 105 such that the supply output 120 provided by the PD pumps exactly matches the demand requirements, timing, and control of the pressure exchange system 135. This coordination between the pumps 110 and the pressure exchange system 135 is effectuated by a fracking program within the control system 105 specifically designed to the characteristics of the receiving system, which is described in greater detail below.

In particular, the fracking program may significantly change the particulate concentrations of the fluids being energized during pumping. This means that the rate and pressure supply of dirty fluids from the third system may vary with changes in particle concentration. The pumps in the third system may thus need to be regulated, via the new control system, such that the supply output provided by these pumps exactly matches the demand requirements, timing, and control of the pressure exchange system.

The fracking program prescribes specific particle density concentrations that are to be used at various times during a fracking stage. Any over, or under, displacement occurring during pressure exchange between the clean and dirty fluids affects the particle density concentration, which has an adverse effect on the frack. Therefore, the control and timing of the first system (i.e., the pressure exchange system 135), second system 117 (i.e., the pumps 110 and controller(s) 115), and third system (i.e., the low pressure fluid supply 150) are highly and actively regulated via the new control system 105 such that the supply output 120 provided by the pumps 110 in the second system exactly matches supply input provided by the third system 150, and they are both matched to the demand requirements, timing, and control of the first system 135.

In operation, the control and timing of the first system 135 is dependent on the input supply rates of the second 117 and third 150 systems. Because all of the systems 117, 135, and 150 are interdependent, any adjustment in supply rate occurring in the second system 117 and/or the third system 150 changes the timing, operation, and performance of the first system 135. If the first system 135 is not adjusted when the supply rate in the second 117 and/or third 150 system is changed, then the fluids from the second system 117 (or the third system 150) will be over displaced, or under displaced, into the third system 150 (or the second system 117). This causes comingling of fluids, and comingling of the properties of the fluids, contained within the second or third systems 117 or 150.

The fluid properties of the clean fluid in the second system 117 are different than the fluid properties of the dirty fluid in the third system 150. During the fluid-to-fluid pressure exchange that occurs in the first system 135, a fluid interface exists between the fluids of the second system 117 and the fluids of the third system 150. Normally, this interface is very small and cross-contamination is largely avoided. Shuttles, or another form of suspended non-sealing materials, may be used to improve separation and further avoid contamination. In some instances, very minor over-displacement can be utilized to refresh and manage this interface. The presence, position, location, and timing of the fluid interface is normally maintained within the first system 135. However, if there is any differential in the rate of supply between the second system 117 and the third system 150, then the control of the interface becomes disrupted, the magnitude of this interface changes, and the mechanism traditionally used to control this interface becomes difficult to manage.

Traditionally, the second system 117 is operated as an open system, meaning that new fluids are continuously being introduced, and the waste, or exhaust fluids are sent for disposal via other means. However, in the system 100 according to embodiments of the invention, the second system 135 is operated as a closed, or semi-closed, system, meaning that the fluids contained within this system will be contained, fluid characteristics generally will be stable, and they will be recycled, reused, reconditioned, and recirculated. So, while contamination of the fluids in the second system was previously acceptable, in embodiments of the pressure exchange system 135 described herein, any contamination of these fluids by fluids contained in the third system will affect the performance capabilities, characteristics and processes employed to manage this closed, or semi-closed, loop system.

In addition to managing the changes in volumes and pressures in the overall system 100, the safety of the system 100 must also be monitored. The operating systems are generally unstable, and subject to leaks, failures, rapid startups, rapid stops, variation in program requirements, and formation responses. Therefore, the systems 135, 117, and 150 must have adequate safety controls to ensure that when these events occur, proper actions are taken to correct system operation, avoid environmental releases, damage to equipment, and personal injury. The new control system 105 described herein must assess inputs from all the sub-systems 117, 135, and 150 to ensure that control safety compliance can be provided at the highest levels.

Given the various requirements of the pressure exchange system 135, and the traditional difficulties with maintaining prior art system, the new master control system 105 is required to receive input from multiple sources and sub-systems, is capable of controlling and providing feedback to each sub-system, and is capable of regulating variable input and output conditions present in the second system 117 and third system 150. According to embodiments of the invention, the control system 105 receives inputs from the receiving subsystem (the well) that indicates changes in resistance, flow, and pressure which affects operation of the pressure exchange system (and therefore, the second and third systems).

A well fracturing program, provided by the engineers, delimits the required rate, density, and pressures that are to be performed in order to optimally execute the hydraulic fracturing process of the well. The control system 105 receives the inputs from the well fracturing program in order to determine the required regulation of the second 117 and third 150 systems. In addition to the inputs from the well fracturing program, the control system 105 determines the optimal timing and control of the valves, and optimal pressure exchange conditions, for the first system 135.

Once the pressure exchange system 135 is activated, the control system 105 receives inputs from the second system 117 indicating the actual fluid characteristics (e.g., density, chemical concentration, etc.) of the clean fluid in the second system 117, and the rates and pressures of the fluids 120 being delivered to the first system 135. Specifically, the control system 105 receives inputs regarding the pressure and rate of fluid output 120 from the PD pumps such that the supply from the second system 117 may be balanced with the third system 150, and integrated into the pressure exchange system 135 to avoid pressure variance. Additionally, the control system 105 receives inputs from the third system 150 indicating the actual fluid characteristics (e.g., density, chemical concentration, etc.) of the dirty fluid in the third system 150, and the rates and pressures of the fluids being delivered to the first system 135.

With the inputs from each of the first, second, and third systems, 135, 117, and 150, the control system is able to instantaneously calculate criteria so that the first, second, and third systems 135, 117, and 150 remain in balance, do not under supply to each other, do not over supply to each other, and are each operating at the most optimal conditions such that pressure exchange occurs at maximum efficiencies.

Importantly, once the criteria are determined, the control system provides signals back to each of the first, second, and third systems representing the determined criteria at which each system should operate. Each subsystem may be adjusted accordingly to the optimal conditions.

The opening and closing of the valves 138 in the pressure exchange unit 135 functionally is a full open or full close event seen by the PD pumps 110. At 9000 PSI, and full rates in the order of 90 BPM, the pressure exchange must be cycled and timed appropriately. If the pressure exchange is slowed, or modulated down, and the PD pump rate is not changed, the PD pumps 110 will over flush and cause clean fluid contamination of the dirty fluids in the receiving system being pumped to the wellhead 130. On the other hand, if the pressure exchange is accelerated, or modulated up, and the PD pump rate is not changed, the PD pumps 110 will under flush and cause dirty fluid contamination of the clean fluids being circulated in the first system 117. It the valve 138 in the pressure exchange system 135 is stopped at any closed or choked condition, the PD pumps 110 will nearly instantaneously over pressure the system 100 resulting in an uncontrolled high-pressure release to the atmosphere through the valve 125. Therefore, the rate at which the pressure exchange system 135 operates the valve 138 in an open and closed position needs to be substantially matched at all times to the pump rate.

Accumulators are not normally run on the high-pressure side. However, by introducing a modulating valve into the pressure exchange system 135, one or more accumulators may be required, and their size needs to be large enough to compensate for potentially thousands of PSI of pressure change. Notably, the high-pressure pulsations caused by valves opening and closing can be modulated either through the use of an accumulator, or timing of the systems such that they naturally cancel each other out, and any damaging harmonic resonance is minimized.

In the third system 150, low-pressure fracking fluid is taken from a fracking fluid tank and introduced into the pressure exchange system 135 in order for the low-pressure fracking fluid to be energized and eventually sent to the well. Before the fracking fluid reaches the pressure exchange system 135, it may go through a blender which mixes the fracking water with the fracking chemicals to form the fracking fluid. Because the fracking fluid passes through the blender on the way to the pressure exchange system 135, the rates of fracking fluid exiting the blender must follow the rates and volumes of the clean fluid from the PD pumps 110 in the second system 117, and therefore the rates and volumes required by the pressure exchange system 135. Once the fracking fluid is energized, it is sent into the well. In the system 117, clean water is taken from a clean water fluid reservoir and sent through the PD pumps 110 to be energized. The energized clean water is sent into the pressure exchange system 135 for pressure exchange with the low-pressure fracking fluid. Once the fracking fluid is energized, the spent clean water may be returned into the clean water tank for reuse, and the fracking fluid is delivered to the well-head.

Figure 3:
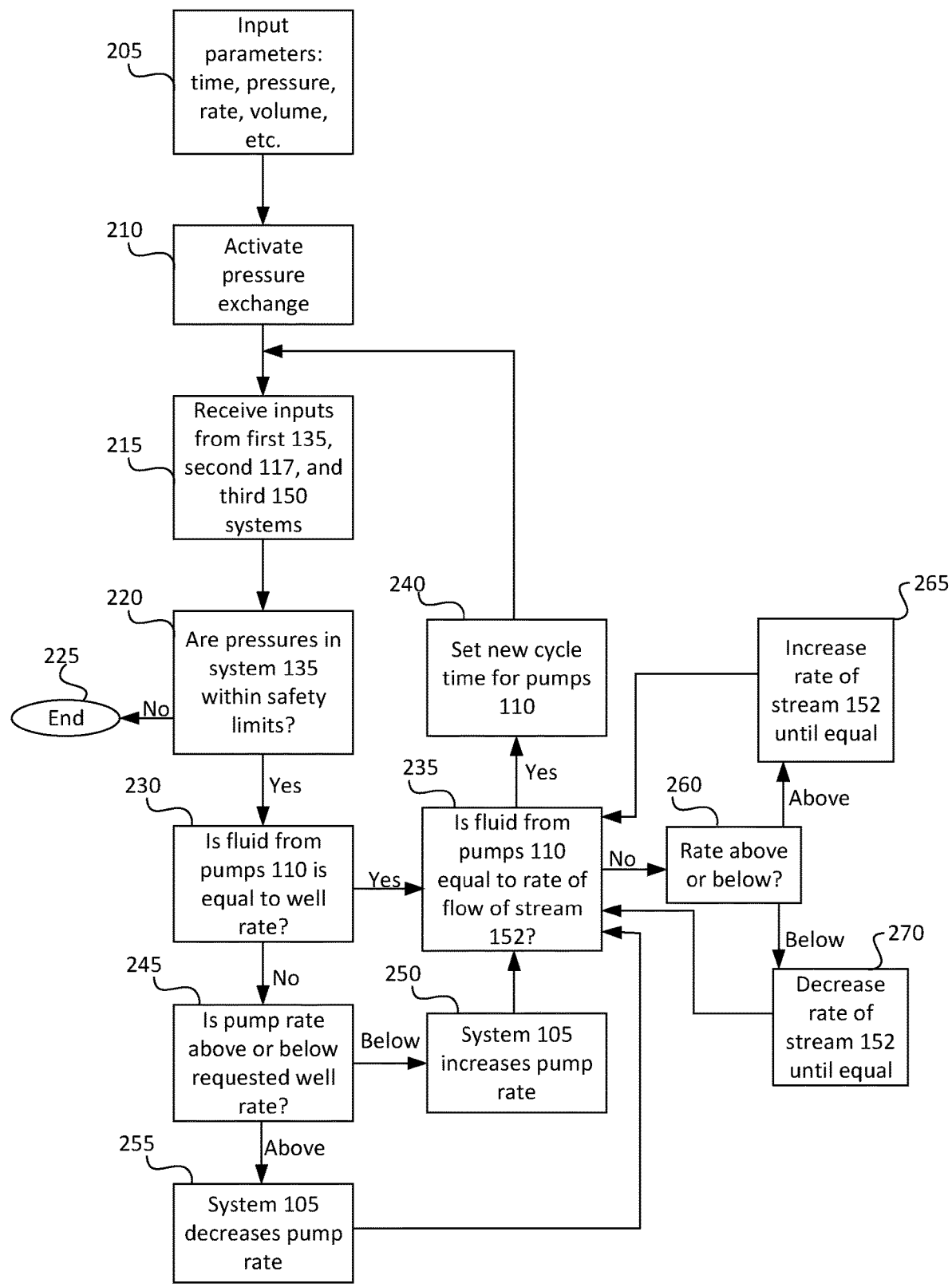
FIG. 3 is a flow chart illustrating various steps in a method of providing a pressure exchange according to an embodiment of the claimed invention.

Moving on, FIG. 3 illustrates a control method for managing the pressure exchange of fluids according to embodiments of the invention. At a high level, the method is designed to control the operation of the system 100 in accordance with the required treating program designed by the engineers and the observed well rate and pressure. As described herein, the pump rate, the blender rate, and the pressure exchange rate must be substantially equal.

The method begins at step 205 by inputting initial parameters into the control system 105, including the time, pressure, fluid rate, and volume of fluid, and/or any other parameters as determined by the program design set by the engineers. The pressure exchange 135 is activated at step 210, and inputs are received from the first system (pressure exchange system) 135, the second system (high-pressure fluid) 117, and the third system (low-pressure fluid) 150 at step 215. Moving on, at step 220, the control system 105 determines if the pressures within the first system 135 are within the safety limits set for the overall system 100. If the pressures are higher than the safety limits, then the system is shutdown at step 225. If not, then the system determines if the rate of the fluid from the PD pumps is equal to the requested well rate per the program design at step 230. If the rates are equal, then the method moves to step 235, where the system 105 determines if the rate of the fluid from the PD pumps 110 is equal to the rate of fracking fluid from the blender (i.e., stream 152). If the rate of the fluid from the PD pumps 110 is equal to the rate of the fracking fluid from the blender, then the method moves to step 240, where the control system 105 determines a new cycle time for the PD pumps 110 based on the inputs from the system and the program design. The cycle time is set, and the process repeats.

If it is determined that the rate of the fluid from the PD pumps 110 is not equal to the requested well rate per the program design at step 230, the method moves to step 245 where the system 105 further determines whether the pump rate is above or below the requested well rate. If the rate of the fluid from the PD pumps 110 is below the requested well rate, then at step 250, the system 105 increases the pump rate (via one or more control sub-systems), and the process moves to step 235 where the system 105 determines if the rate of the fluid from the PD pumps 110 is equal to the rate of fracking fluid from the blender, as described above. If the rate of the fluid from the PD pumps is above the requested well rate, the system 105 decreases the pump rate (via one or more control sub-systems) at step 255, and the process then moves to step 235, where it is determined if rate of the fluid from the PD pumps 110 is equal to the rate of fracking fluid from the blender.

If the system determines at step 235 that the rate of the fluid from the PD pumps 110 is not equal to the rate of the fracking fluid from the blender (stream 152), then the system 105 further determines whether the pump rate is above or below the rate of fracking fluid leaving the blender at step 260. If the rate of the fluid from the PD pumps is above the rate of fracking fluid leaving the blender, then at step 265 the system increases the rate (via one or more control sub-systems) of the fracking fluid leaving the blender until the rate of the fluid from the PD pumps equals the rate of the fracking fluid leaving the blender. If, however, the rate of the fluid from the PD pumps 110 is below the rate of the fracking fluid leaving the blender, the system 105 decreases the rate of the fracking fluid leaving the blender (via one or more control sub-systems) at step 270 until the rate of the fluid from the PD pumps equals the rate of the fracking fluid. FIG. 3 thus illustrates that the pressure exchange system 135 is dependent on the rate of the fluid from the PD pumps 110 (the second system 117), which is affected by the rate of the fracking fluid leaving the blender (the third system 150). Each of the systems 135, 117, and 150 must operate at substantially the same rate in order to optimize the pressure exchange and avoid system failure.

Many different arrangements of the various components depicted, as well as components not shown, are possible without departing from the spirit and scope of this disclosure. Embodiments of this disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure. It will be understood that certain features and subcombinations are of utility and may be employed without reference to other features and subcombinations, and are contemplated within the scope of this disclosure. Not all steps listed in the various figures need to be carried out in the specific order described. The description should not be limited to the specific described embodiments.

What is claimed is:

1. A method for optimizing pressure exchange in a pressure exchange system, comprising:
  providing an assembly comprising a first system, a second system, and a third system, wherein:
    the first system is a pressure exchange system comprising an energy recovery device;
    the second system supplies high-pressure fluid to the first system for the energy recovery device, wherein the high-pressure fluid of the second system is energized by at least one positive displacement pump;
    the third system supplies low-pressure fluid to the first system for the energy recovery device;
    the first system energizes the low-pressure fluid from the third system with the high-pressure fluid from the second system to form a high-pressure fracking fluid; and
    the second system delivers the high-pressure fracking fluid from the first system to a well-head receiving system;
  providing a control system;
  inputting a rate of required flow into the control system;
  determining, via the control system, a rate of flow of the high-pressure fluid from the second system;
  determining, via the control system, a rate of flow of the low-pressure fluid from the third system;
  determining, via the control system, an actual rate of flow of the high-pressure fracking fluid at the well-head receiving system;
  adjusting to equilibrium, via the control system:
    the rate of flow of the high-pressure fluid from the second system based on the actual rate of flow; and
    the rate of flow of the low-pressure fluid from the third system based on the actual rate of flow.

2. The method of claim 1, wherein the method further comprises adjusting, via the control system, a timing of an opening of a valve in the first system based on the actual rate of flow.

3. The method of claim 1, wherein the method further comprises:
  comparing, via the control system, the rate of required flow to the actual rate of flow of the high-pressure fracking fluid at the well-head receiving system;
  determining a new rate of flow based on the comparison of the rate of required flow with the actual rate of flow of the high-pressure fracking fluid at the well-head receiving system;
  adjusting, via the control system:
    the rate of flow of the high-pressure fluid from the second system based on the new rate of flow; and
    the rate of flow of the low-pressure fluid from the third system based on the new rate of flow.

4. The method of claim 3, wherein the method further comprises adjusting, via the control system, a timing of an opening of a valve in the first system based on the new rate of flow.

5. The method of claim 4, wherein the new rate of flow is less than the actual rate of flow if the actual rate of flow is greater than the rate of required flow.

6. The method of claim 4, wherein the new rate of flow is greater than the actual rate of flow if the actual rate of flow is less than the rate of required flow.

7. The method of claim 1, further comprising the steps of:
  determining, via the control system, a pressure, a viscosity, and a density of the high-pressure fluid from the second system;
  determining, via the control system, a pressure, a viscosity, and a density of the low-pressure fluid from the third system;
  determining a new rate of flow based on the pressure, the viscosity, the density, and the actual rate of flow of each of the second system and the third system;
  adjusting, via the control system, a timing of an opening of a valve in the first system based on the new rate of flow.

8. The method of claim 1, further comprising:
  determining a volume of the high-pressure fluid in the second system;
  comparing the volume of the high-pressure fluid in the second system with a prior volume of high-pressure fluid in the second system to determine a presence of a net gain or a net loss of the high-pressure fluid in the second system;
  if the presence of a net gain or a net loss is determined:
    activating, via the control system, a warning; and
    adjusting, via the control system, a timing of an opening of a valve in the first system.

9. The method of claim 8, further comprising:
  if the presence of a net gain or a net loss is determined:
    adjusting, via the control system, the rate of flow of the high-pressure fluid from the second system; or
    adjusting, via the control system, the rate of flow of the low-pressure fluid from the third system;
    wherein a displacement volume in the first system of the high-pressure fluid from the second system is approximately equal to a displacement volume in the first system of the low-pressure fluid from the third system during pressure exchange.

10. The method of claim 1, wherein the energy recovery device is a dual work exchanger energy recovery device.

11. The method of claim 10, further comprising the steps of:
  determining, via the control system, a pressure, a viscosity, and a density of the high-pressure fluid from the second system;
  determining, via the control system, a pressure, a viscosity, and a density of the low-pressure fluid from the third system;
  determining a new rate of flow based on the pressure, the viscosity, the density, and the actual rate of flow of each of the second system and the third system;
  adjusting, via the control system, a timing of an opening of a valve in the first system based on the new rate of flow.

12. The method of claim 11, further comprising:
  if the presence of a net gain or a net loss is determined:
    adjusting, via the control system, the rate of flow of the high-pressure fluid from the second system; or adjusting, via the control system, the rate of flow of the low-pressure fluid from the third system;

wherein a displacement volume in the first system of the high-pressure fluid from the second system is approximately equal to a displacement volume in the first system of the low-pressure fluid from the third system during pressure exchange.

13. The method of claim 10, further comprising:

determining a volume of the high-pressure fluid in the second system;

comparing the volume of the high-pressure fluid in the second system with a prior volume of high-pressure fluid in the second system to determine a presence of a net gain or a net loss of the high-pressure fluid in the second system;

if the presence of a net gain or a net loss is determined:
activating, via the control system, a warning; and
adjusting, via the control system, a timing of an opening of a valve in the first system.

14. A method for optimizing pressure exchange in a pressure exchange system, comprising:

providing a system comprising a first system, a second system, and a third system, wherein:
the first system is a pressure exchange system comprising an energy recovery device;
the second system supplies high-pressure fluid to the first system for the energy recovery device, wherein the high-pressure fluid of the second system is energized by at least one positive displacement pump;
the third system supplies low-pressure fluid to the first system for the energy recovery device;
the first system energizes the low-pressure fluid from the third system with the high-pressure fluid from the second system to form a high-pressure fracking fluid; and
the second system delivers the high-pressure fracking fluid from the first system to a well-head receiving system;

providing a control system;

inputting a required rate of flow into the control system;

determining, via the control system, a rate of flow of the high-pressure fluid from the second system;

determining, via the control system, a rate of flow of the low-pressure fluid from the third system;

determining, via the control system, an actual rate of flow of the high-pressure fracking fluid at the well-head receiving system;

adjusting, via the control system, the rate of flow of the high-pressure fluid from the second system to the required rate of flow; and adjusting, via the control system, the rate of flow of the low-pressure fluid from the third system such that the rate of flow of the low-pressure fluid from the third system is greater than the required rate of flow.

15. The method of claim 14, wherein the method further comprises adjusting, via the control system, a timing of an opening of a valve in the first system based on the actual rate of flow.

16. The method of claim 15, wherein the shuttle valve diverts low-pressure fluid from the third system away from the first system when the volume of the low-pressure fluid from the third system reaches the conduit fill volume.

17. The method of claim 14, wherein:
the first system comprises a conduit comprising a shuttle valve;
the shuttle valve is configured to prevent flow of the low-pressure fluid from the third system into the conduit when a volume of the low-pressure fluid from the third system reaches a conduit fill volume.

18. The method of claim 14, wherein:
the first system comprises a conduit comprising a shuttle valve having a bypass valve, the conduit being configured to operate in a pressure exchange mode;
the shuttle valve is configured such that, when the conduit is operating in pressure exchange mode:
one of high-pressure fluid from the second system or low-pressure fluid from the third system is allowed to enter the conduit;
the other of the high-pressure fluid from the second system or low-pressure fluid from the third system is prevented from entering the conduit; and
the other of the high-pressure fluid from the second system or low-pressure fluid from the third system is diverted via the bypass valve to prevent interruption of flow.

19. The method of claim 14, wherein the energy recovery device is a dual work exchanger energy recovery device.

* * * * *